United States Patent [19]

Cotter et al.

[11] 4,229,559
[45] Oct. 21, 1980

[54] NOVEL BIS(HALF ESTER) AND COMPOSITIONS CONTAINING THE SAME

[75] Inventors: Robert J. Cotter, Bernardsville; Hugh C. Gardner, Somerville, both of N.J.

[73] Assignee: Union Carbide Corporation, New York, N.Y.

[21] Appl. No.: 34,996

[22] Filed: May 1, 1979

[51] Int. Cl.$^2$ .................. C08F 222/12; C07C 69/34
[52] U.S. Cl. .................. 526/271; 428/290; 428/375; 428/407; 525/43; 525/48; 525/49; 526/192; 526/204; 526/217; 526/318; 528/272; 528/306; 560/202; 560/204
[58] Field of Search .......... 260/860, 861; 526/192, 526/271, 318, 204, 217; 528/272, 306; 428/375; 560/202, 204; 525/43

[56] References Cited

U.S. PATENT DOCUMENTS

| 3,320,336 | 5/1967 | Duke et al. | 260/861 |
| 3,373,144 | 3/1968 | Janssen et al. | 528/306 |
| 3,466,264 | 9/1969 | Hagemeyer et al. | 528/306 |
| 3,766,129 | 10/1973 | Pesez | 260/40 R |
| 3,784,586 | 1/1974 | Thomas et al. | 260/861 |
| 4,137,279 | 1/1979 | Smith et al. | 260/861 |

Primary Examiner—John Kight, III
Attorney, Agent, or Firm—Donald M. Papuga

[57] ABSTRACT

This invention is directed to a half ester characterized by the following empirical formula:

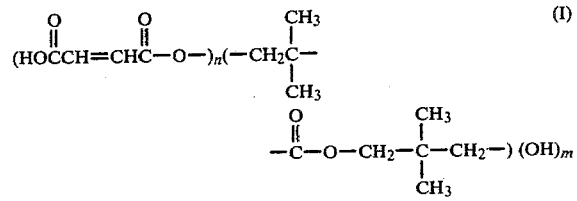

wherein n is a number having an average value of 1.7 to 2, and m is equal to 2−n. Also described herein is a composition comprising said half ester, maleic anhydride and an ethylenically unsaturated monomer, wherein at least 75 mole percent of the half ester is in the maleate form.

6 Claims, No Drawings

NOVEL BIS(HALF ESTER) AND COMPOSITIONS CONTAINING THE SAME

This invention relates to a novel half ester of 2,2-dimethyl-3-hydroxypropyl 2,2-dimethyl-3-hydroxypropionate (also characterized as "hydroxyneopentyl hydroxypivalate"). Also, the invention describes a composition comprising said half ester, maleic anhydride and an ethylenically unsaturated monomer wherein 75 mole percent of the half ester is in the maleate half ester form. This composition can be utilized in the manufacture of composite structures, and particularly in the manufacture of fiber-reinforced plastic compositions (FRP).

Conventional polyester resins are solutions of unsaturated polyesters in styrene. The polyesters are typically produced by the condensation polymerization of maleic anhydride or maleic acid with a polyol, typically a diol. The resulting polyester product contains a certain concentration of unsaturation in the backbone of the polymer which is derived from the initial unsaturated acid or its anhydride. Typical commercial polyesters can be as simple as poly(propylene maleate) or as complex as the product from the co-reaction of maleic anhydride or acid, phthalic anhydride and a mixture of diols.

A polyester widely used in automotive applications is made from maleic anhydride and propylene glycol. However, due to the requirements of increased toughness, newer commercial polyesters utilized in automotive applications are frequently more complex in their structure. They are typically derived from the co-reaction of maleic anhydride, isophthalic or terephthalic acids or their esters, and glycols such as propylene glycol, diethylene glycol, dipropylene glycol and/or ethylene glycol. Maleic anhydride or acid is a starting component in these polyesters. During the manufacture of these polyesters, considerable isomerization of the maleate structure into the fumarate form occurs. Thus, most of these resins contain fumarate type double bonds as the predominant source of the unsaturation present in their backbone. The molecular weight (Mn) of these conventional polyesters can range from about 500 to about 5,000. However, most of the commercial polyesters have molecular weights (Mn) of from about 1300 to about 2500.

Fiberglass has been widely used as a reinforcement in the manufacture of thermoset molded articles. These types of articles have been termed "Glass Reinforced Plastics" (GRP) and "Glass Fiber Reinforced Plastics" (GFR). The fiberglass content in these thermoset molded articles ranges from about 15 to about 75–80 weight percent. Polyester resins are used primarily as the resin component in these glass reinforced thermoset plastics.

The aforedescribed polyester resins have been employed in the manufacture of a variety of glass reinforced products by different types of processes. The processes of forming glass reinforced products are generally in two categories, i.e., wet lay up and thickened processes. Wet lay up processes include the following: pre-impregnation of a fibrous mass with resin, followed by compression molding; preforming in which cut fiber and resin are sprayed onto a mold form itself; mat molding, in which liquid resin is poured onto a mat while the mat is disposed in a compression mold; bulk molding, in which a non-thickened mixture of staple fiber and polyester resin are poured into a mold.

In thickened processes, polyester resin reacts with an inorganic alkaline earth metal oxide or hydroxide such as, magnesium oxide and calcium hydroxide, to increase the viscosity of the fiber containing resin so that it has a non-liquid paste-like quality. The resin can then be handled and deposited within the framework of a mold to achieve a more uniform and more convenient molding. Thus, sheet molding compounds (SMC) are formed by depositing resins uniformly across a layer of cut fiberglass fibers randomly deposited upon a polyethylene film. The polyethylene film is sandwiched by another layer of polyethylene film and the combination is fed through nip rollers which blends the polyester resin uniformly within the fibrous mat to form a sheet. The sheet is allowed to stand so that reaction occurs between the carboxy groups of the polyester resin and the alkaline earth metal oxide filler. The resin increases in viscosity and it can then be easily handled in the molding procedure. This same technique can be utilized in producing bulk molding compounds (BMC). Alkaline earth metal is added to the bulk molding composition in an amount sufficient to thicken the composition to a desired viscosity so that it can be readily handled. The thickened bulk molding compounds are employed in transfer and injection moldings.

Thickened bulk molding compounds, however, have not been widely used in injection molding since their viscosities are normally higher than is desirable for effective molding, and the equipment required to mold the high viscosity thickened bulk molding compound is extremely expensive, large, and cumbersome to operate. A further disadvantage in using thickened bulk molding compounds in an injection molding process is that the fibers must be of very short length in order to effectively distribute the fiber throughout the mold. The short lengths of the fibers minimizes the reinforcement so that the resulting molded article does not have optimum performance characteristics particularly, strength properties.

However, polyester resin systems have been developed which provide good surface properties to the molded product. These polyester resin systems are used in the manufacture of "Class A" molded products employed in the automotive industry. These products have extremely low profile surfaces which are free of warpage, undulations, and fiber protrusions. This low profile results from adding a low profile additive to the BMC or SMC formulation. A low profile additive is a thermoplastic compound which contains a sufficient number of carboxylic acid groups allowing it to become intricately bound into the resin system so that it is not exuded therefrom. Low profile additives can also be utilized in wet lay up processes to form glass reinforced products. Non-carboxylated containing thermoplastics are very effective low profile additives for resin systems used in the wet lay up process although carboxylated thermoplastics presently available for the same purpose can be so utilized.

The glass fiber reinforced polyester resin systems which are used to form "Class A" products typically contain from about 15 to 40 weight percent of glass fiber. These fiber reinforced polyester resin systems are used to mold products where surface appearance is very important, but strength properties are not necessarily as important. However, structural products are expected to have high strength properties. For example, "Class A" products cannot be used in automotive applications where structural integrity is a critical factor. Recently, a series of glass fiber reinforced polyester resins have been developed which utilize the thickening characteristics of SMC, BMC, and the like, but which contain extremely high concentrations of glass fiber. For example, a series of polyester compositions containing from about 50 to about 75 weight percent of glass fibers have been developed. These polyester compositions can be used in making molded products, but typically, they do not possess the desirable surface characteristics which provides a "Class A" product. However, their strength characteristics, which is supplied by the high concentration of glass fibers, provides unique markets for these glass fiber reinforced polyester resins. The fibers in these reinforced resins are either unidirectionally aligned, as from continuous filament tow, or are randomly distributed in long fibers in a polyester mat, or from a combination thereof, to supply enhanced multi-directional strength to the molded article. The high glass fiber containing polyester resins are sheet molding compounds, XMC, HMC, (XMC and HMC are trademarks of PPG Industries, Inc.) and MSMC-R-Fiber content such as 50-65, (trademarks of Owens Corning Fiberglas Corp.). These high glass fiber content resin systems are molded only by compression molding procedures.

U.S. Pat. No. 3,784,586, patented Jan. 8, 1974, to Philippe Thomas et al., describes a composition which is characterized as a copolymerizable oligoester having maleic acid end groups in combination with vinyl monomers, and a method for preparing the composition. According to the patent, maleic anhydride is reacted with one or more polyhydroxylated compounds in the ratio of a mole of maleic anhydride per hydroxyl group of the polyhydroxylated compound or compounds, at a temperature within the range of 50° C. to 100° C. until the reaction mixture has a hydroxyl number below or equal to 20. Thereafter, at a temperature between room temperature and 100° C., a cross-linking vinyl monomer and a polymerization inhibitor are added. According to the patent, it is essential that the reaction temperature between maleic anhydride and polyhydroxylated compound not exceed 100° C., in order to avoid the transposition from the maleic (i.e., cis) form, into the fumaric (i.e., trans) form.

Example 1 of U.S. Pat. No. 3,784,586 describes the reaction of 2,2,4-trimethyl-1,3-pentanediol with maleic anhydride. It is stated that a composition with a hydroxyl number of 20 is obtained after heating the mixture for 4 hours at 80° C. To obtain this result, 93.9 mole percent of the maleic anhydride must react with the hydroxyl groups on the diol. In repeating Example 1 of this patent, it has been determined that about 23 mole percent of the maleic anhydride is unreacted after 4 hours at 80° C.

U.S. Pat. No. 3,320,336, patented May 16, 1967, to Duke et al, describes the manufacture of a conventional polyester in which 2,2-dimethyl-3-hydroxypropyl 2,2-dimethyl-3-hydroxypropionate is utilized as a dihydroxy compound in making the polyester. The polyester is typically produced by direct esterification of a melt of said dihydroxy compound with a bifunctional unsaturated dibasic acid such as maleic acid or anhydride, fumaric acid, phthalic anhydride, isophthalic acid, and tetrahydrophthalic anhydride and the like. The reaction temperatures are above 220° C. The polyesters have molecular weights ranging from 750 to 5000. The proportions of the dihydroxy compound and the unsaturated dibasic acid are approximately equimolar and preferably, with a slight molar excess of the dihydroxy compound. The resulting unsaturated polyesters can be blended with one or more monoethylenically unsaturated polymerizable monomers, such as styrene.

The patentee characterizes the polyesters as having improved properties since they can be made at higher temperatures because of the higher boiling point of the dihydroxy compound. Therefore, the residual time for effecting the reaction is shorter, utilizing reaction times "of about from 5–10 hours." The polyesters set forth in U.S. Pat. No. 3,320,336 are characterized as being particularly stable to thermal and oxidative degradation which makes them especially useful in the preparation of fiber glass boat hulls and other materials which require outstanding hydrolytic and oxidative stability.

THE INVENTION

It has now been found that the half ester of the present invention can be utilized in compositions which form cured polymeric compositions having outstanding properties particularly when utilized in combination with fibers in making fiber reinforced plastic (FRP) compositions. The compositions of this invention have extremely low viscosities which allows them to be utilized in fiber reinforced plastic molding compositions containing large amounts of fiber. FRP employing the compositions of this invention are prepared by injection molding processes, wet lay-up techniques (such as premix and preform molding) and transfer molding procedures. Also, FRP employing the compositions of this invention are utilized in the manufacture of bulk molding compositions which can be molded by injection molding, transfer molding and compression molding procedures, and the like.

Additionally, the compositions of this invention can be produced at much higher temperatures and utilize shorter reaction times than the compositions prepared as described in U.S. Pat. No. 3,784,586.

Further in contrast to the compositions described in U.S. Pat. No. 3,320,336, the compositions of this invention are produced at lower temperatures i.e., lower than the 220° C. required by U.S. Pat. No. 3,320,336, and shorter reaction times. Additionally, the oligomers in the composition of this invention possess lower molecular weights than those of U.S. Pat. No. 3,320,336.

The half ester of this invention is characterized by the following empirical formula:

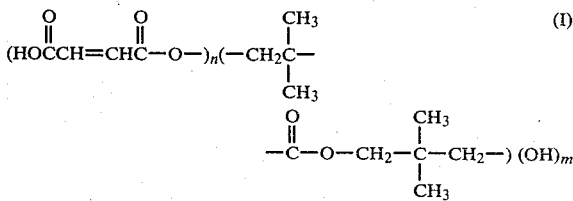

wherein n is a number having an average value of 1.7 to 2, and m is equal to 2−n.

The composition of this invention comprises the half ester of formula (I), maleic anhydride, and an ethylenically unsaturated monomer, wherein at least 75 mole percent of the half ester (I) is in the maleate form.

The compositions of this invention contain a mole ratio of half ester to maleic anhydride ranging from about 6:1 to about 200:1, preferably from about 9:1 to about 100:1. In the most typical and desirable embodiment, the mole ratio of half ester to maleic anhydride is from about 12:1 to about 30:1. The mole ratio of ethylenically unsaturated monomer to half ester ranges from about 0.6:1 to about 6:1, preferably from about 1.1:1 to about 4:1. In the most typical and desirable embodiment, the mole ratio of monomer to half ester ranges from about 1.2:1 to about 3:1. The maximum amount of unreacted maleic anhydride in the composition is about 15 mole percent, based on the amount of maleic anhydride employed in producing the half ester.

The compositions of this invention may be prepared by reacting 2,2-dimethyl-3-hydroxypropyl 2,2-dimethyl-3-hydroxypropionate (hereinafter called "the diol"), with maleic anhydride in the presence or absence of an ethylenically unsaturated monomer.

The ethylenically unsaturated monomer employed in the composition of this invention is one which forms a liquid homogeneous mixture with maleic anhydride and the half ester structure depicted by formula (I) above. In addition, the ethylenically unsaturated monomer has to be copolymerizable with both maleic anhydride and the half ester.

Suitable ethylenically unsaturated monomers which may be employed in the practice of this invention are one or more monomers which contain a —CH=C< group, and preferably a CH$_2$=C< group. These monomers include styrene and its derivatives and homologues, diallyl phthalate, divinylbenzene, acrylic acid or methacrylic acid and their derivatives such as their esters, amides or nitriles, e.g. methyl acrylate, methyl methacrylate, n-butyl methacrylate, acrylamide, methacrylamide, acrylonitrile, methacrylonitrile, and the like. Also, the monomers include vinyl ethers and esters, e.g. vinyl acetate, vinyl propionate, methyl vinyl ether, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene. The molar ratio of maleic anhydride to the diol is between about 1.7 and about 2.2.

The presence of the ethylenically unsaturated monomer in the reaction is dependent upon the temperature at which the reaction is effected. When the reaction is carried out at a temperature below about 60° C., then it is feasible to employ styrene in the reaction system.

However, before proceeding to describe the details of the preparation of the composition of this invention, a discussion of the equilibrium that takes place in the reaction is appropriate. The reaction between maleic anhydride and the diol is an equilibrium process. At higher temperatures, the equilibrium composition contains a larger amount of unreacted maleic anhydride. Thus, the product made at an elevated temperature will typically contain a diol that is not completely reacted and therefore, the reaction product will contain significant amounts of unreacted hydroxyl groups. At temperatures of from about 120° C. to about 145° C., 80 to 85 percent reaction of the maleic anhydride with the diol is achieved. However, when the reaction mixture is cooled from elevated temperature to room temperature, i.e., 23° C., the reaction continues and the equilibrium shifts to the right favoring more complete reaction of maleic anhydride with the residual hydroxyl groups of the product formed at the elevated temperature. The reaction equilibrium favors reaction of maleic anhydride to a potential maximum of about 93 plus percent when the reaction is conducted at room temperature. However, when the reaction is carried out at room temperature, it takes days to effect. In carrying out the reaction in the presence of a catalyst (a basic compound) as hereinafter set forth, the same equilibrium phenomenon occurs, except that the reaction is conducted over a substantially shorter period of time.

There are a number of materials which are termed anhydride activating catalysts for this reaction. These materials serve the purpose of activating the opening of the anhydride ring and forming product in a shorter period of time. Suitable anhydride activating catalysts include tin compounds and amine compounds, preferably secondary or tertiary amines. The amine catalysts possess a pKb of 9.0±3.0. Some of these catalysts, for example, 4-vinylpyridine, are copolymerizable with the half esters of this invention and the ethylenically unsaturated monomer. This is a desirable feature. The catalyst is used in amounts of from about 0.02 to about 5.0 and preferably, from about 0.05 to about 2 weight percent based on the combined weight of the diol and maleic anhydride used in making the composition of this invention.

Amines suitable for use in the practice of this invention include, by way of illustration, the following:

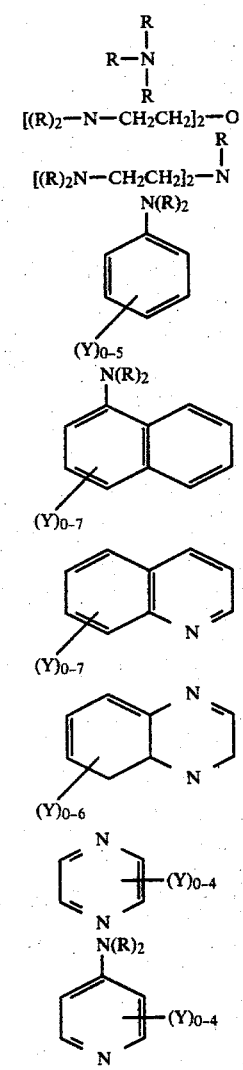

-continued

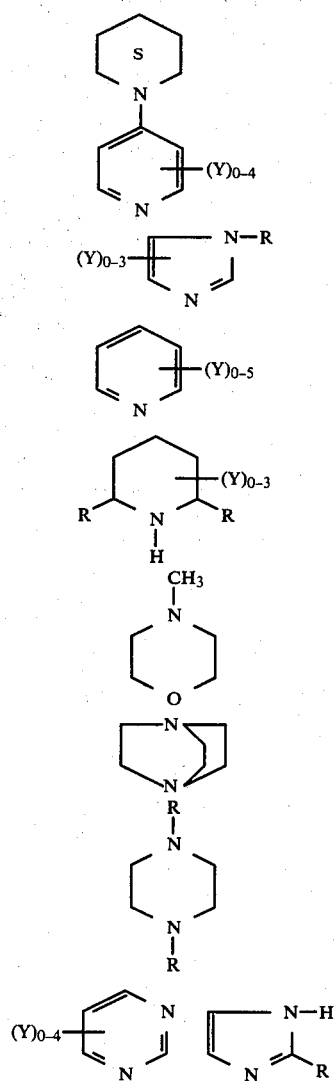

wherein the R's are independently selected from alkyl of 1 to 8 carbon atoms such as, $CH_3$, $C_2H_5$, $C_3H_7$, $C_4H_9$, and aralkyl of 7 to 15 carbon atoms such as

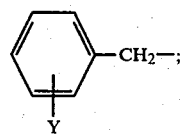

Y is independently selected from alkyl of 1 to 4 carbon atoms, alkoxy of 1 to 4 carbon atoms and halogen. Also included herein are 1,5-diazabicyclo[5.4.0]-undec-5-ene and 1,5-diazabicyclo[4.3.0]-non-5-ene.

Suitable tin compounds are organic tin salts or oxides which are typically employed as a catalyst in other arts such as, the manufacture of urethane foams, the conversion of caprolactone into polycaprolactone in the presence of an active hydrogen compound, and the like. Tin compounds suitable for use in the practice of this invention include stannous octoate, dibutyltin oxide, dibutyltin dilaurate, and a tin compound which contains a trifluorosulfonyl group and is sold by the Minnesota Mining and Manufacturing Company, Minneapolis, Minnesota under the trademark of "L-4429".

The process of this invention is carried out at temperatures of from about 15° C. to about 160° C. The sequence in which the maleic anhydride, the diol and ethylenically unsaturated monomer are combined depends on the reaction temperature.

If the unsaturated monomer is present during the reaction between the maleic anhydride and the diol, then the reaction temperature should be below the temperature at which maleic anhydride will copolymerize with the unsaturated monomer. A temperature of about 60° C. is the maximum temperature to use when the unsaturated monomer is present during the reaction between maleic anhydride and the diol.

If the composition of this invention is prepared above about 60° C., then it is desirable to first react the maleic anhydride and the diol. After about 70 percent of the maleic anhydride has reacted, the ethylenically unsaturated monomer is added. The temperature of the liquid body is rapidly reduced to the desired temperature or to room temperature. The lower temperature is optional and is dependent upon the method used to carry out the process, the type of equipment being used and the manner in which the composition produced will be utilized.

A basic compound such as amine or tin catalyst can be used in the process of this invention. The catalyst can be added to the solution of the diol, maleic anhydride and ethylenically unsaturated monomer at a temperature below about 60° C. or to a mixture of diol and maleic anhydride at a temperature above about 40° C. The formation of the half esters is an exothermic reaction. If the latter reaction mode is used, it is desirable to cool the reaction mixture before adding the unsaturated monomer to the reaction mixture. This is desirably carried out at temperatures below about 110° C. and after 70 percent of the maleic anhydride has reacted. In the practice of this invention, it is desirable that not more than about 25 mole percent of the maleate half ester is converted into fumarate half esters and preferably, not more than about 15 mole percent. In the present composition, high fumarate content is undesirable since it leads to insolubility in styrene.

The rate at which the maleate structure is converted into the fumarate structure is dependent upon the temperature to which the reaction mixture is heated. When the reaction is carried out in the absence of a catalyst at 140° C., about four percent of the maleic anhydride initially charged is converted into fumarate structures in about 40 minutes. At 110° C., less than one percent of maleic anhydride is converted into fumarate structures in about one hour. Certain amine catalysts isomerize the maleate half ester faster than others. For example, pyridine is a more effective isomerization catalyst than is 1-methylimidazole.

The present reaction may be carried out under subatmospheric, atmospheric, or superatmospheric pressure conditions. However, it is usual to use atmospheric pressure conditions.

The present reaction is desirably conducted in the absence of water. However, it is frequently impossible in a practical operation of this process to insure that all of the reactants will be absolutely dry and that the atmosphere in which the reaction is conducted will be totally free of any moisture. In the practical operation of the present process, water in an amount equivalent to that which could theoretically convert 1 weight percent of the maleic anhydride used in the reaction can be tolerated. This is preferably considered a maximum amount. In the usual case water is present in a relatively trace amount resulting in considerably less than 1 weight percent of the maleic anhydride being reacted to maleic acid.

To ensure that the amount of water that gets into the reaction is as low as feasible, it is desirable to utilize an inert moisture free atmosphere in carrying out the reaction. This moisture free atmosphere can be provided by relatively dry gasses such as dry nitrogen, carbon dioxide, methane, helium, argon, and the like. Another technique which can be employed to insure that only a small amount of water is in the reaction system, is to add maleic anhydride to the reaction in an amount in excess of that required for the reaction. This excess maleic anhydride is stoichiometrically equivalent to the amount of water present so that the water reacts with the excess maleic anhydride and converts it to maleic acid. The maleic acid is insoluble in the composition containing styrene and can be precipitated out and/or conveniently filtered out.

In carrying out the reaction, it is desirable to mix the reactants. The degree of mixing is not critical and gentle stirring of the reaction mass is sufficient. To avoid any complications in the reaction, it is desirable to effectively disperse the anhydride activating catalyst throughout the composition.

In order to avoid premature reaction between the half ester and styrene, it is desirable to add polymerization inhibitors to the reaction mixture. These polymerization inhibitors include tertiary butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 600 parts per million by weight.

The composition of this invention can be cured by free radical mechanisms such as, electron beam radiation, actinic radiation, azo and peroxide curing agents such as those which are described by Gallagher, et al "Organic Peroxides Review", Plastics Design & Processing, July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators operate to effect a desirable cure is generally characterized in the aforementioned articles.

The composition of this invention may contain a small amount of condensation products in the form of diester from a single maleic anhydride molecule. They result from the reaction of the half ester with residual hydroxyl groups on the diol. It is desirable in making the present composition that such a condensation product not consume more than about 8 mole percent of the maleic anhydride used in the reaction. Most desirably not more than about 5 mole percent of maleic anhydride is involved in the formation of such condensation products. Conversion of more than 10 percent of the maleic anhydride to diesters is deleterious since the condensation reaction generates water, which reacts with maleic anhydride converting it to maleic acid. Maleic acid is insoluble in the mixture containing styrene and will precipitate.

The acid number of the maleic anhydride/diol reaction mixture of this invention can be measured by two procedures. In the first procedure, the product is dissolved in aqueous pyridine and titrated against KOH. In the second procedure the acid number is determined by dissolving the solution in a mixture of pyridine and methanol and titrating against KOH. The first procedure, using aqueous pyridine, determines maleic anhydride as the diacid. In the second procedure, using a mixture of pyridine and methanol, maleic acid is determined as a monoacid. Therefore, the acid number of the maleic anhydride-diol reaction mixture is about 280 mg of KOH per gram by the pyridine/methanol method when the stoichiometry of the reaction is 2 moles of maleic anhydride per mole of the diol. Since the mixture always contains an equilibrium amount of unreacted maleic anhydride, the acid number determined in aqueous pyridine will always be larger than that obtained in the pyridine/methanol mixed solvent. Typically, the reaction mixture formed from 2 moles of maleic anhydride and 1 mole of the diol and containing 10 mole percent of unreacted maleic anhydride will have an acid number of about 308 mg of KOH per gram.

In contrast to conventional polyester resins, the compositions of this invention possess much higher acid numbers. For example, the acid number of a resin containing the diol/maleic anhydride product and 30 weight percent styrene is about 196 (pyridine/methanol method). Conventional polyester resins generally have acid numbers in the range of from 15 to 40.

Mixtures of the half ester, maleic anhydride, and styrene form low viscosity fluids when mixed. For example, a mixture containing 30 weight percent of styrene has a viscosity of 115 centipoises at 23° C. With a styrene content of 45 weight percent, the resin viscosity drops to 28 centipoises. In contrast, most commercial polyester resins have viscosities in the range of 550 to 3,000 centipoises at similar styrene levels.

The compositions of this invention are particularly useful for the manufacture of rigid fiber reinforced molded articles. A preferred procedure for producing molded articles from this composition is described in copending U.S. patent application Ser. No. 035,011 entitled "Molding Process and Apparatus Therefore," and May 1, 1979 in the name of R. Angell, Jr. which is incorporated herein by reference. In this application, Ser. No. 035,011, a process for rapidly fabricating fiber reinforced thermoset resin articles is described. The fiber reinforcement is comprised of one or more fibers with a melting point or a glass transition temperature above about 130° C. The process comprises the steps of (a) providing one or more of such fibers in the form of an interlocked mass in a heatable matched metal die mold, (b) providing in an accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing the mold containing the web, (d) injecting at least a portion of said thermosettable organic material under pressure from said accumulator zone into the mold to thereby fill the cavity in said mold, (e) initiating the curing of said materials by heating the mold, above the temperature at which the curing of said materials is initiated, and (f)

opening said mold and removing the cured thermoset article therefrom. The fiber reinforcement may be from about 15 to about 80 weight percent of the weight of the molded article which is removed from the mold.

Due to the low viscosity of the compositions of this invention, they readily flow through and about and within the total confines of the mold and the fibrous material contained therein to effect a uniform distribution of the reaction product within the ultimate molded product.

By means of the above process, the compositions of this invention can be used to prepare composite articles of high stiffness and strength. Compared to other similar resins wherein 2,2-dimethyl-3-hydroxypropyl 2,2-dimethyl-3 hydroxypropionate (i.e., the diol) is replaced by other diols, the instant composition affords fiber reinforced composite articles with equal or superior mechanical properties. Furthermore, the water sorption tendency of composites made with the diol are reduced relative to those of composites made with other diols.

The compositions of this invention can be cured neat or in combination with fillers, pigments, fibers, with a melting point or a glass transition temperature above 130° C., such as fiberglass, carbon fibers, graphite fibers, metallic fibers and aromatic polyamide fibers (such as aramid fibers sold by E. I. duPont Nemours, Wilmington, Delaware and sold under the trademark Kevlar) etc, hollow glass or phenolic resin spheres, and the like. The composition of this invention can be used to impregnate fabrics, to manufacture laid up laminate structures, to make electrical pottings and castings and the like.

The following examples serve to illustrate specific embodiments of this invention and it is not intended that the invention shall be limited by the examples.

COMPARATIVE EXAMPLE

A 1 liter, 3-necked flask fitted with a paddle stirrer, nitrogen inlet and outlet, a thermometer, and an electric heating mantle was charged with 288.8 g of molten 2,2,4-trimethyl-1,3-pentanediol and 387.8 g of molten maleic anhydride. The solution was warmed to 110° C. and maintained at this temperature for 3 hours. 0.1 g of hydroquinone was then added. The product, which was a clear amber liquid, was poured into a jar for storage. Three days later the product was a white, opaque semisolid. NMR analysis of the product in $d_6$-dimethylsulfoxide indicated that the maleic anhydride containing components possessed the following distribution:
8.3 mole percent maleic anhydride,
18.3 mole percent fumarate esters,
56.6 mole percent maleate esters (maleate half esters and diester),
16.7 mole percent maleic acid.
A portion of this product was dissolved in styrene. A copious white solid precipitated. It was identified as maleic acid by NMR analysis.

This Example supports the statement in U.S. Pat. No. 3,784,586 that reaction temperature in excess of 100° C. result in resins of inferior quality. Contrary to the inferences in U.S. Pat. No. 3,784,586, the poor quality (i.e., precipitate) is not due to the presence of fumarate groups in the resin, but to maleic acid. The large amount of maleic acid produced in this experiment results in a thermosetting resin with a low crosslink density compared to a resin wherein essentially all of the anhydride is utilized to form crosslinkable oligomers.

EXAMPLE 1

A 3 liter, 3 necked round bottomed flask fitted with a paddle stirrer, nitrogen inlet and outlet, a thermometer equipped with a Therm-O-Watch controller and an electric heating mantle was charged with 833.2 g of (2,2-dimethyl-3-hydroxypropyl 2,2-dimethyl-3-hydroxypropionate) and 800.0 g of maleic anhydride. The mixture was warmed to melt the reactants. The temperature of the mixture was raised to 140° C. and maintained at that temperature by applying a cooling bath until the reaction exotherm subsided. The mixture was heated for an additional 30 minutes at 140° C. The mixture was then cooled to 80° C., treated with 0.32 g of hydroquinone. The yield was 1557 g (95%), indicating a 5% mechanical loss. The mixture was stored for 25 days. Analysis of the maleic anhydride components in the stored mixture by $^1$H nmr spectroscopy indicated that 8 mole percent of the anhydride was unreacted, 88 mole percent was in the maleate form (maleic acid, mono- or diester), and 4 mole percent was in the fumarate form. The acid number of the resin was 303 mg KOH/g(in aqueous pyridine), indicating that the major portion of the maleic anhydride was present as the half ester. Less than 5 percent of the maleate containing species were maleic acid or maleate diesters. The NMR spectrum was determined in predeuterated dimethylsulfoxide.

The product obtained was a clear viscous liquid. It remained a clear liquid for more than 50 days.

EXAMPLE 2

A 2 liter, 4 necked flask fitted with a paddle stirrer, thermometer with Therm-O-Watch controller, a nitrogen inlet and outlet, and a heating mantle was charged with 347.0 g (3.54 moles) of molten maleic anhydride and heated to 120° C. 361.4 g (1.77 moles) of molten 2,2-dimethyl-3-hydroxypropyl 2,2-dimethyl-3-hydroxypropionate (the diol) was added in increments at such a rate so as to maintain the reaction temperature at ~120° C. This addition took 42 minutes. External heat was applied occasionally to maintain the temperature, but no cooling was required. The reaction temperature ranged from 113° C. to 128° C. At the end of the diol addition, $^1$H nmr analysis of the product indicated 25 mole percent of free anhydride and 75 mole percent of maleates.

The reaction mixture was maintained at 120° C. to observe the effect of prolonged heating.

The results are shown in Table I.

TABLE I

| | Effect of Time of Heating at 120° C. on Product Composition | | |
|---|---|---|---|
| Time at | Composition (mole%) | | |
| 120° C. (hr.)$^a$ | Maleic Anhydride | Maleates | Fumarates |
| 0 | 25 | 75 | 0 |
| 2.2 | 15 | 83 | 2 |
| 4.7 | 15 | 81 | 4 |

$^a$After completion of the diol addition.

In contrast to the Comparative Example (with 2,2,4-trimethyl-1,3-pentanediol), the amount of maleic anhydride converted to maleic acid after 4.7 hours was less than 6 percent of the original charge.

EXAMPLE 3

The apparatus as described in Example 1 was charged with 408.52 g of molten 2,2-dimethyl-3-hydroxypropyl 2,2-dimethyl-3-hydroxypropionate and 392.24 g of molten maleic anhydride. The solution was heated to 110° C., and held at this temperature by applying a cooling bath until the reaction exotherm subsided. The temperature was maintained at 110°±5° C. for 1.2 hours. The mixture was then cooled to room temperature and poured into a jar for storage. A sample was titrated in aqueous pyridine. The acid number was 316 mg of KOH/g. Proton NMR analysis of the product indicated that the maleic anhydride derived components consisted of 90.6 percent maleates (almost exclusively the maleate half ester with less than 5 percent maleic acid or maleate diester) and 9.4 percent of unreacted maleic anhydride. No fumarate containing products were detected.

EXAMPLE 4

A 16 ounce jar containing a magnetic stirring bar was charged with 22.7 g of molten 2,2-dimethyl-3-hydroxypropyl 2,2-dimethyl-3-hydroxypropionate, 21.8 g of molten maleic anhydride, 36.4 g of styrene and 24 mg of hydroquinone inhibitor. As the solution was rapidly stirred, 0.78 ml (1 wt. %) of 1-methylimidazole was added. Immediately the color of the mixture changed from yellow to brown and the reaction temperature climbed from 37° C. to a maximum of 52° C. within 2 minutes. The temperature of the reaction mixture then dropped from 52° C. to 30° C. over the next 60 minutes. The clear brown solution was sampled periodically to follow the course of the reaction. The percent of maleic anhydride reacted was determined by titrating samples in (a) aqueous pyridine, and in (b) a pyridine/methanol solvent. The results are shown in Table II as follows:

TABLE II

| Time after addition of 1-methylimidazole catalyst (hr.) | Maleic anhydride reacted (percent) |
| --- | --- |
| 0.6 | 73 |
| 19 | 91 |
| 49 | 94 |

The reaction mixture remained a clear brown precipitate-free liquid resin for 80 days.

EXAMPLE 5

The procedure described in Example 4 was exactly repeated except that 1-methylimidazole was not added. A clear solution of 19.7 g of 2,2-dimethyl-3-hydroxypropyl 2,2-dimethyl-3-hydroxypropionate, 18.5 g of maleic anhydride, 31.3 g of styrene, and 21 mg of hydroquinone was allowed to stand at room temperature. The progress of the reaction was followed using the titrimetric procedures described in Example 4.

The results are set forth in Table III as follows:

TABLE III

| Time after mixing the diol, maleic anhydride, and styrene (hr) | Maleic anhydride reacted (percent) |
| --- | --- |
| 20 | 20 |
| 71 | 38 |
| 1704 | 98[1] |

[1]This includes 5.5% as maleic acid precipitate.

After three days, the reaction mixture consisted of a yellow low viscosity solution. As compared with Example 4, this reaction which does not use catalyst is much slower.

EXAMPLE 6

The procedure described in Example 4 was exactly repeated except that stannous octoate was used instead of 1-methylimidazole. 18.9 g of 2,2-dimethyl-3-hydroxypropyl 2,2-dimethyl-3-hydroxypropionate, 18.1 g of maleic anhydride, 30.3 g of styrene, 20 mg of hydroquinone and 0.67 g of stannous octoate were mixed at 33° C. The temperature of the solution did not increase upon addition of the stannous octoate. The temperature slowly returned to room temperature (23° C.).

Table IV lists the progress of the reaction as determined by the titrimetric methods described in Example 4.

TABLE IV

| Time after addition of stannous octoate (hr) | Maleic anhydride reacted (percent) |
| --- | --- |
| 1.8 | 39 |
| 21 | 61 |
| 112 | 87 |

After 8 days, the reaction mixture consisted of a yellow low viscosity solution containing about 2 weight percent of crystalline maleic acid as a precipitate.

EXAMPLE 7

A flask was charged with 30.0 g of maleic anhydride and 31.2 g of 2,2-dimethyl-3-hydroxypropyl 2,2-dimethyl-3-hydroxypropionate and warmed to 65° C. The clear solution was agitated as 0.61 g of pyridine was added by syringe. The temperature of the reaction mixture increased to a maximum of 125° C. in 2 minutes. Over the next 8 minutes, the temperature decreased to 83° C. Then the reaction mixture was removed from the bath allowed to stand at room temperature for 3 hours. NMR analysis of the mixture indicated that the maleic anhydride containing components had the following distribution:

9.1 mole percent unreacted maleate anhydride,
5.5 mole percent fumarates, and
85.4 mole percent maleates.
No maleate diesters or maleic acid were detected.

The reaction mixture was diluted with 60 g of styrene containing 35 mg of t-butyl hydroquinone to give a clear liquid solution. This composition remained a clear liquid for more than 23 days at room temperature.

The following Examples 8 to 27 show the effect of various anhydride activating catalysts on the reaction of maleic anhydride with 2,2-dimethyl-3-hydroxypropyl 2,2-dimethyl-3-hydroxypropionate.

EXAMPLE 8

A 125 ml. Erlenmeyer flask was charged with 30.0 g of molten maleic anhydride and 31.2 g of molten 2,2-dimethyl-3-hydroxypropyl 2,2-dimethyl-3-hydroxypropionate and placed in an oil bath at 75°±10° C. The magnetically stirred solution was allowed to equilibrate to the bath temperature. 1.0 weight percent of 1,4-diazabicyclo[2.2.2]octane was added. After 10 minutes the reaction mixture was removed from the oil bath, cooled to room temperature, and analyzed by titration procedures to determine the amount of maleic anhydride reacted. 76 percent of the maleic anhydride reacted after 10 minutes.

The addition of maleic anhydride to 2,2-dimethyl-3-hydroxypropyl 2,2-dimethyl-3-hydroxypropionate is an exothermic reaction. The relative effectiveness of the catalyst was determined by recording the change in temperature of the reaction mixture after addition of catalyst. The most effective catalysts produced the largest exotherms.

Table VI shows the type of catalyst, amount added to the reaction, the initial temperature, maximum temperature, the change in temperature ($\Delta T$) and the time to reach maximum temperature.

EXAMPLES 9-27

The procedure of Example 8 was exactly repeated except that the types of catalysts and the amount thereof added to the reaction as shown in Table VI, were substituted for 1.0 weight percent of the 1,4-diazabicyclo[2.2.2]octane catalyst of Example 8.

The initial temperature, maximum temperature, the change in temperature ($\Delta T$) and the time to reach maximum temperature are as set forth in Table VI.

TABLE VI

| Example | Catalyst (wt %) | Initial Temp (°C.) | Maximum Temp (°C.) | $\Delta T$ (°C.) | Time to reach Maximum Temp (min) |
|---|---|---|---|---|---|
| Control | None | 67 | 67 | 0 | — |
| 8 | 1,4 Diazabicyclo [2.2.2]octane (1.0) | 75 | 103 | 28 | 2.8 |
| 9 | O-[CH$_2$CH$_2$N(CH$_3$)$_2$]$_2$ (1.0) | 70 | 100 | 30 | 4.6 |
| 10 | 2.2 mole ethoxylate of aniline (1.0) | 75 | 83 | 8 | 7.0 |
| 11 | 4-(dimethylamino) pyridine (1.0) | 78 | 122 | 44 | 2.5 |
| 12 | Triethylamine (1.0) | 78 | 107 | 29 | 2.0 |
| 13 | 1-methylimidazole (1.0) | 78 | 124 | 46 | 1.3 |
| 14 | 1-methylimidazole (0.3) | 77 | 84 | 7 | 7.0 |
| 15 | N,N-dimethyl toluidine (1.0) | 67 | 88 | 21 | 6.4 |
| 16 | N,N-dimethyl aniline (1.0) | 67 | 74 | 7 | 9.5 |
| 17 | 4-Vinylpyridine (0.5) | 70 | 105 | 35 | 2.8 |
| 18 | Pyridine (0.5) | 65 | 110 | 45 | 3.0 |
| 19 | 2,6-dimethyl piperidine (1.0) | 70 | 108 | 38 | 2.0 |
| 20 | N,N-dimethyl piperazine (1.0) | 70 | 102 | 32 | 2.0 |
| 21 | Stannous octoate (1.0) | 68 | 97 | 29 | 3.1 |
| 22 | Dibutyltin dilaurate (1.0) | 84 | 85 | 1 | 3.0 |
| 23 | Dibutyltin oxide (1.0) | 78 | 85 | 7 | 10.0 |
| 24 | L-4429[1] (1.0) | 74 | 119 | 45 | 3.6 |
| 25 | 2-methylimidazole | 69 | 102 | 33 | 4.5 |
| 26 | BF$_3$ . H$_2$NC$_2$H$_5$ (1.0) | 73 | 80 | 7 | 8.5 |
| 27 | Trifluoroacetic acid (1.0) | 78 | 82 | 4 | 7.0 |

[1] A tin compound which contains a trifluorosulfonyl group and is sold by the Minnesota Mining and Manufacturing Company.

EXAMPLE 28

Casting A

A solution was prepared from 55.0 g of the 2,2-dimethyl-3-hydroxypropyl 2,2-dimethyl-3-hydroxypropionate/maleic anhydride reaction product of Example 1, 64.7 g of styrene, and 1.2 g of t-butyl hydroperoxide. The solution was poured into a 10×10×⅛ inch mold and heated at 85° C. for 16 hours. The casting was post cured for 6 hours at 125° C.

The flexural strength, flexural modulus (measured according to ASTM 0790-66) and Barcol hardness (ASTM D-2583) are set forth in Table VII.

EXAMPLE 29

Casting B

A solution was prepared from 132 g of a 2,2-dimethyl-3-hydroxypropyl 2,2-dimethyl-3-hydroxypropionate/maleic anhydride reaction product prepared as in Example 1, 108 g of styrene, 0.7 g of Zelec UN mold release (an organophosphate mold release agent sold by E. I. du Pont de Nemours, Wilmington, Del.), and 2.4 g of t-butyl hydroperoxide. The solution was poured into two 10×10×⅛ inch molds and cured for 16 hrs. at 85° C. The castings were post cured for 6 hours at 125° C.

The flexural strength, flexural modulus and Barcol hardness of the casting are set forth in Table VII.

TABLE VII

| | Properties of Casting | |
|---|---|---|
| Casting | A | B |
| Flexural strength (psi) | 8000 | 7300 |
| Flexural modulus (10$^6$ psi) | 0.56 | 0.57 |
| Barcol hardness | 43 | 46 |

The castings show acceptable flexural strengths, flexural moduli and hardness.

EXAMPLE 30

Composite C

A thermosetting resin composition was prepared by mixing 55.4 g of a 2,2-dimethyl-3-hydroxypropyl 2,2-dimethyl-3-hydroxypropionate/maleic anhydride reaction product prepared as in Example 1, 64.7 g of styrene, 0.36 g of Zelec UN mold release agent and 1.2 g of t-butyl perbenzoate.

A bed of 5 plies of PPG type AKM chopped strand glass mat (PPG Industries, Inc. Pittsburgh, Penn.), weighing 100.1 g was compressed to a thickness of ⅛ inch and placed into a mold of dimensions 8×8×⅛ inches. The mold was heated to 135° C.

A portion of the resin was injected into the mold in eleven seconds. The injection pressure ranged from 30 to 60 psi and the injection time was less than 15 seconds. After 15 minutes, the mold was opened and a light green, nearly translucent glass reinforced sample was removed from the mold. This sample weighed 183.9 g.

The composite was tested to determine flexural strength and modulus.

The glass content of the composite and flexural strength and modulus are set forth in Table VIII.

EXAMPLE 31

Composite D

A thermosetting resin composition was prepared by mixing 324 g of a 2,2-dimethyl-3-hydroxypropyl 2,2-dimethyl-3-hydroxypropionate/maleic anhydride reaction product prepared as in Example 1, 276 g of styrene, 1.8 g of Zelec UN mold release agent, 1.2 g of t-butyl perbenzoate, and 90 mg of hydroquinone.

A bed of 5 plies of PPG type AKM glass mat weighing 62.8 g compressed to a thickness of ⅛ inch was placed in a mold of dimensions 5×8×⅛ inches. The mold was heated to 135° C.

A portion of the resin was injected into the mold. The injection pressure ranged from 30 to 50 psi and the injection was completed in 10 seconds. After 5 minutes, the composite was removed from the mold. The composite was tested to determine flexural strength and modulus.

The glass content of the composite and flexural strength and modulus are set forth in Table VIII.

EXAMPLE 32

Composite E

This example describes the preparation of a composite using a composition outside the scope of this invention. 2,2-Dimethyl-1,3-propanediol was substituted for 2,2-dimethyl-3-hydroxypropyl 2,2-dimethyl-3-hydroxypropionate in the process as set forth in Example 1.

A thermosetting resin composition was prepared from the following
247.5 g of the 2,2-dimethyl-1,3-propanediol/maleic anhydride reaction product,
202.5 g of styrene,
1.5 g of Zelec UN, and
4.5 g of t-butyl perbenzoate.

A glass reinforced composite was molded and tested using the process as set forth in Example 31. The glass content of the composite and flexural strength and modulus are set forth in Table VIII.

EXAMPLE 33

Composite F

This example describes the preparation of a composite using a composition outside the scope of this invention. Dipropylene glycol was substituted for 2,2-dimethyl-3-hydroxypropyl 2,2-dimethyl-3-hydroxypropionate in the process as set forth in Example 3, except that the reaction was carried out for 5 hours.

A thermosetting resin composition was prepared from the following
229.5 g of the dipropylene glycol/maleic anhydride reaction product,
220.5 g of styrene,
1.5 g of Zelec UN, and
4.5 g of t-butyl perbenzoate A glass reinforced composite was molded and tested using the process described in Example 31.

The glass content of the composite and flexural strength and modulus are set forth in Table VIII.

TABLE VIII

| Composite | C | D | E | F |
|---|---|---|---|---|
| Glass Content (wt. %) | 54 | 56 | 56 | 50 |
| Flexural Strength (psi) | 35,700 | 35,100 | 29,700 | 29,300 |
| Flexural Modulus ($10^6$ psi) | 1.59 | 1.81 | 1.42 | 1.53 |

The results show that composites C and D made with the compositions of this invention have excellent mechanical properties.

EXAMPLE 34

The water sorption characteristics of composites D, E, and F were tested. The test was carried out by boiling 1×3×⅛ inch test specimens of the composites for 2 hrs in water. The water sorption was measured by weighing the samples before and after the test. A low value is preferred since it indicates less swelling and weakening of the sample.

The results are shown in Table IX.

TABLE IX

| Composite | D | E | F |
|---|---|---|---|
| Water sorption (% weight gain after a 2 hr water boil) | 0.9 | 2.3 | 1.3 |

The results show that the composite D made with the composition of this invention possesses reduced water sorption characteristics as compared to composities made with compositions which are produced from other diols.

What is claimed is:

1. A half ester characterized by the following empirical formula:

$$(HOCCH=CHC-O-)_n(-CH_2C- \quad (I)$$

(with structure showing)

$$\begin{array}{c} O \quad O \quad CH_3 \\ \parallel \quad \parallel \quad | \\ (HOCCH=CHC-O-)_n(-CH_2C- \\ | \\ CH_3 \\ O \quad CH_3 \\ \parallel \quad | \\ -CO-CH_2-C-CH_2-)(OH)_m \\ | \\ CH_3 \end{array}$$

wherein n is a number having an average value of 1.7 to 2 and m is equal to 2−n.

2. A composition comprising
   (a) a half ester characterized by the following empirical formula:

$$\begin{array}{c} O \quad O \quad CH_3 \\ \parallel \quad \parallel \quad | \\ (HOCCH=CHC-O-)_n(-CH_2C- \\ | \\ CH_3 \\ O \quad CH_3 \\ \parallel \quad | \\ -C-O-CH_2-C-CH_2-)(OH)_m \\ | \\ CH_3 \end{array} \quad (I)$$

wherein n is a number having an average value of 1.7 to 2, and m is equal to 2−n,
   (b) maleic anhydride, and
   (c) an ethylenically unsaturated monomer, wherein 75 mole percent of the half ester (I) is in the maleate form.

3. A composition as in claim 2 which contains the residue of an anhydride activating catalyst.

4. A composition as in claim 3 wherein the anhydride activating catalyst is selected from an amine or a tin compound.

5. A cured molded article prepared from the composition of claim 2.

6. A cured molded article as in claim 5 wherein the molded article contains from about 15 to about 80 weight percent, of the weight of the molded article of one or more fibers with a melting point or a glass transition temperature above about 130° C.

* * * * *